(12) United States Patent
Wang et al.

(10) Patent No.: US 10,333,422 B2
(45) Date of Patent: *Jun. 25, 2019

(54) CONSTANT INRUSH CURRENT CIRCUIT FOR AC INPUT POWER SUPPLY UNIT

(71) Applicant: Dell Products L.P., Round Rock, TX (US)

(72) Inventors: Lei Wang, Austin, TX (US); Mehran Mirjafari, Austin, TX (US); Ashish Razdan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/043,065

(22) Filed: Feb. 12, 2016

(65) Prior Publication Data

US 2016/0164429 A1 Jun. 9, 2016

Related U.S. Application Data

(63) Continuation of application No. 14/512,111, filed on Oct. 10, 2014, now Pat. No. 9,281,758.

(51) Int. Cl.
*H02M 7/06* (2006.01)
*H02H 9/00* (2006.01)

(52) U.S. Cl.
CPC .............. *H02M 7/06* (2013.01); *H02H 9/001* (2013.01); *H02M 7/062* (2013.01)

(58) Field of Classification Search
CPC .................................. H02M 7/06; H02H 9/001
See application file for complete search history.

(56) References Cited

U.S. PATENT DOCUMENTS

| 5,122,724 A * | 6/1992 | Criss ..................... H02H 9/001 323/222 |
| 6,445,165 B1 | 9/2002 | Malik et al. |
| 6,690,250 B2 | 2/2004 | Møller |
| 6,714,429 B2 | 3/2004 | Phandke |

(Continued)

OTHER PUBLICATIONS

C.S.Mitter, "Active Inrush Current Limiting Using Mosfets," Motorola Semiconductor Application Note AN1542/D, 1995, 14 Pages, Motorola, Inc.

(Continued)

*Primary Examiner* — Jue Zhang
(74) *Attorney, Agent, or Firm* — Haynes and Boone, LLP (57) ABSTRACT

A power supply circuit includes a rectifier module configured to rectify an input voltage and a capacitor including a first terminal coupled to the rectifier module. In addition, the power supply circuit includes first and second transistors. The first transistor couples to a second terminal of the capacitor, and the second transistor couples in series to the first transistor. The power supply circuit also includes a resistor, configured to set an inrush current value, in parallel with the second transistor. When coupled to a power supply, the power supply circuit is configured to turn-on the first transistor such that an inrush current flows, at the inrush current value, through the capacitor, first transistor, and resistor. After a delay time, the power supply circuit is configured to turn-on the second transistor such that the inrush current drops to around zero, thus maintaining a low impedance path during steady-state operation.

15 Claims, 10 Drawing Sheets

(56) References Cited

U.S. PATENT DOCUMENTS

| | | | |
|---|---|---|---|
| 7,446,583 B2 | 11/2008 | Fazakas | |
| 7,787,271 B2 | 8/2010 | Popescu et al. | |
| 9,281,758 B1* | 3/2016 | Wang | H02M 7/062 |
| 2003/0107859 A1* | 6/2003 | Pan | H02H 9/001 |
| | | | 361/58 |
| 2006/0152954 A1* | 7/2006 | Jovanovic | H02M 1/32 |
| | | | 363/89 |
| 2009/0174386 A1 | 7/2009 | Popescu et al. | |
| 2010/0283554 A1 | 11/2010 | Oppermann et al. | |
| 2011/0006748 A1* | 1/2011 | Jang | H02M 1/36 |
| | | | 323/299 |
| 2013/0187543 A1 | 7/2013 | Chang et al. | |

OTHER PUBLICATIONS

Chien-An Lai, Yen-Shin Lai, "New AC/DC Converter Considering Both Inrush Current Limitation and Start-Up Time," Power Electronics and Drive System (PEDS), 2013, p. 1231-p. 1235, Center for Power Electronics, National Taipei University of Technology, Taipei, Taiwan.

Narek Pezeshkian, "Very Low-Power Inrush-Current Limiter Protects Hot-Pluggable Apps," Electronic Design, May 19, 2010, 4 Pages, http://electronicdesign.com/power/very-low-power-inrush-current-limiter-products-hot-pluggable-apps.

Michael Raspotnig, "Power Supplies With Significantly Reduced Inrush Current," Puls Application Note, 2006, pp. 1-3, Order No. AN30.01.en Rev. 1, www.pulspower.com.

Eun-Ju Lee, Jung-Hoon Ahn, Seung-Min Shin and Byoung-Kuk Lee, "Comparative Analysis of Active Inrush Current Limiter for High-Voltage Dc Power Supply System," 2012, p. 1256-p. 1260, IEEE, 2012 IEEE Vehicle Power and Propulsion Conference, Oct. 9-12, 2012, Seoul, Korea, College of Information and Communication Engineering, Sungkyunkwan University, Korea.

A.S. Kislovski, "Fast Active Inrush Current Limiter for Boost-Based Resistor Emulators," Telecommunication Energy Conf., 1994, vol. 21-4, p. 649-p. 652, Ascom Energy System Ltd., IEEE, Berne, Switzerland.

Mark Pearson, "Current Limiting Key to Hot-Swap Circuit Protection," EE Times Connecting the Global Electronics Community, Sep. 18, 2002, 6 pages, UBM Electronics.

"Inrush Current Control," Power-One Powering Communications and Technology, Power-One Application Note, Mar. 5, 2001, Revision A; pp. 1-7.

* cited by examiner

CONSTANT INRUSH CURRENT CIRCUIT FOR AC INPUT POWER SUPPLY UNIT

CROSS-REFERENCE TO RELATED APPLICATIONS

This is a Continuation application to U.S. Utility application Ser. No. 14/512,111, filed Oct. 10, 2014, entitled "CONSTANT INRUSH CURRENT CIRCUIT FOR AC INPUT POWER SUPPLY UNIT," the disclosure of which is incorporated herein by reference in their entirety.

BACKGROUND

The present disclosure relates generally to information handling systems, and more particularly to a circuit for providing a constant inrush current for an AC power supply unit which provides power to an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 10:
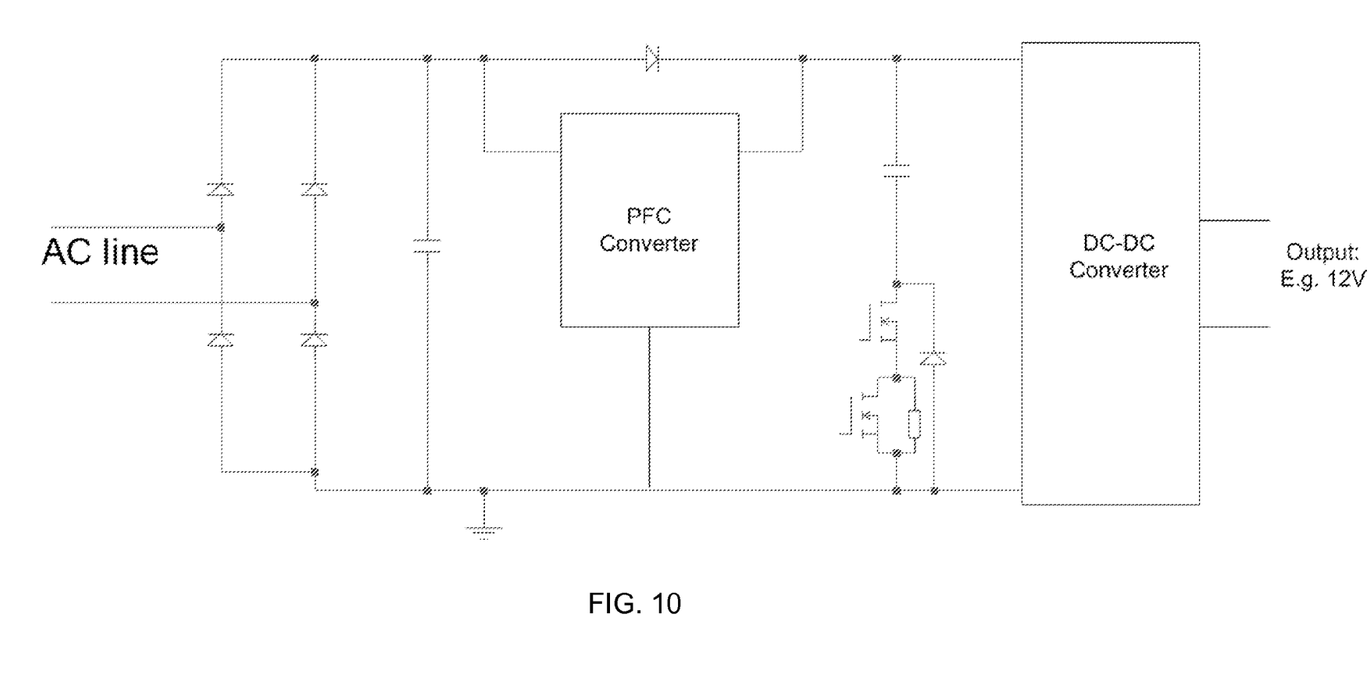
FIG. 10 is a schematic view of a conventional power supply unit (PSU) including a power-factor correction (PFC) converter.

Irrespective of the form of the IHSs, or of any specific hardware and/or software components embodied therein, a power supply unit (PSU) is indispensable for IHS operation. Conventionally, PSUs are implemented as switched-mode power supplies (SMPSs) to provide greater power conversion efficiency (e.g., as compared to a linear power supply). However, SMPSs in particular suffer from large inrush currents. Inrush currents, which are large transient currents exceeding a normal operating current, occur when an SMPS is first energized (i.e., turned-on). Without proper protection, such inrush currents may overstress circuit and/or system components, create unwanted electromagnetic interference, or cause other types of circuit disturbances and/or failures. Conventional PSUs may include a power-factor correction (PFC) circuit (e.g., including a rectifier and boost converter) front-end, followed by a bulky electrolytic capacitor for energy storage, then another isolated DC-DC converter downstream to generate the voltage (e.g., 12V) for computing devices, as shown in FIG. 10. The electrolytic capacitor need to address both 120 Hz ripple and hold up time requirement, so its size is usually big. To limit inrush current to the electrolytic capacitor at turn-on (e.g., when an AC power source is connected to the PSU), a power resistor or a negative temperature coefficient (NTC) resistor is generally used in series with the line input or in series with the electrolytic capacitor. In steady state, the power resistor or NTC resistor is short-circuited by a relay or a metal-oxide-semiconductor field-effect transistor (MOSFET) connected in parallel to the power resistor or NTC resistor. However, power resistors and NTC resistors are very bulky, a necessity to satisfy pulse power requirements. In addition, conventional inrush current limiting circuits (e.g., based on power resistors or NTC resistors) may still result in currents transients that are not entirely controllable, and which may degrade the circuit and/or component lifetime (e.g., of a capacitor, a rectifier, a fuse, a breakers, etc.).

Accordingly, it would be desirable to provide an improved system for limiting and controlling inrush currents.

SUMMARY

According to one embodiment, a power supply circuit includes a rectifier module including first and second input terminals and first and second output terminals. The rectifier module is configured to rectify an input voltage. The power supply circuit further includes an output capacitor including a first terminal coupled to the first output terminal of the rectifier module. In addition, the power supply circuit includes a first transistor including first and second current electrodes, and a second transistor including third and fourth current electrodes. The first current electrode of the first transistor is coupled to a second terminal of the output capacitor. The third current electrode of the second transistor is coupled to the second current electrode of the first transistor, and the fourth current electrode of the second transistor is coupled to the second output terminal of the rectifier module. The power supply circuit also includes a resistor connected in parallel with the second transistor, where the resistor is configured to set an inrush current value. When the first and second input terminals of the rectifier module are coupled to a power supply, the power supply circuit is configured to turn-on the first transistor such that an inrush current flows, at the inrush current value, through the output capacitor, the first transistor, and the resistor. After the rectifier module has been coupled to the power supply for a specified delay time, to make sure the inrush current drops to around zero, the power supply circuit is configured to turn-on the second transistor.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
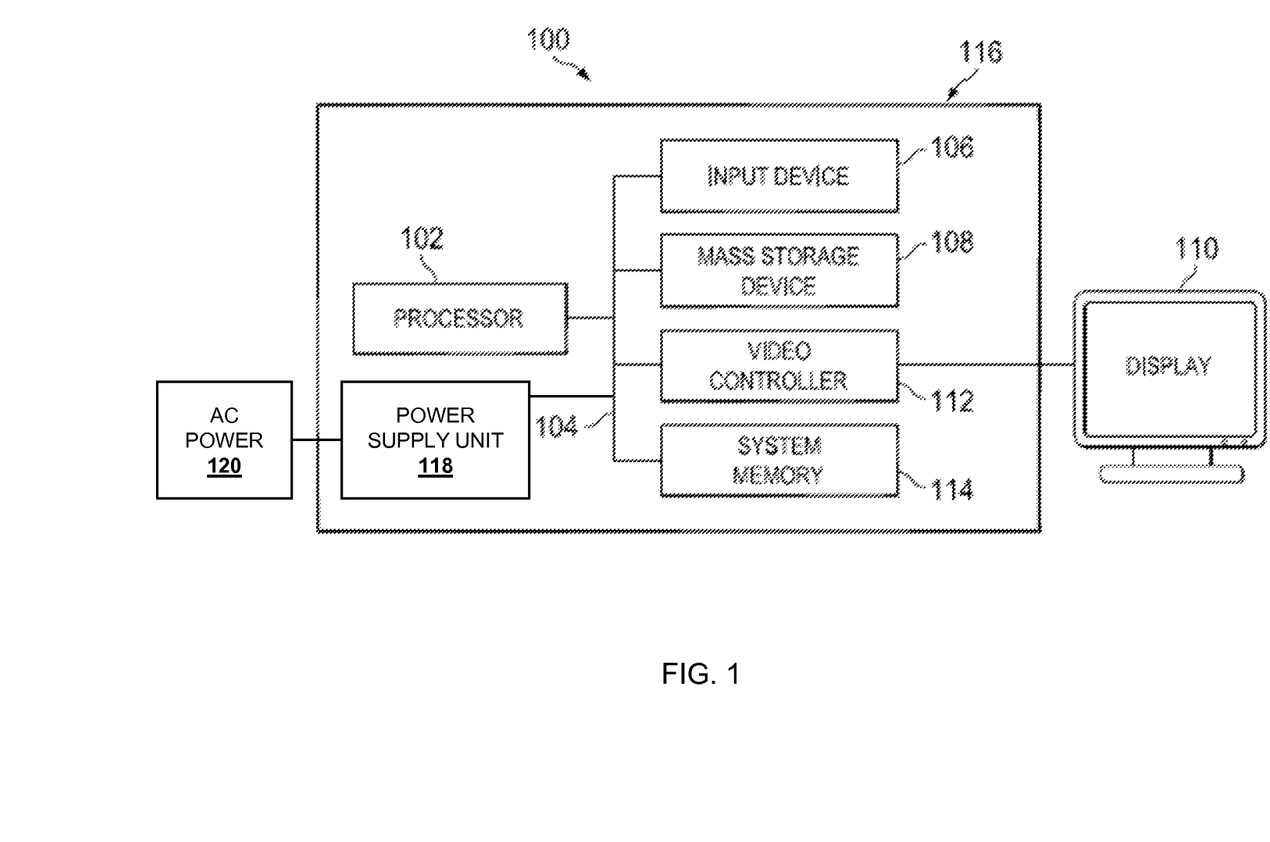
FIG. 1 is a schematic view illustrating an embodiment of an information handling system (IHS)

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. A power supply unit (PSU) 118 is coupled to one or more components of the IHS 100 to provide power to the one or more components. In some examples, the PSU 118 includes an SMPS configured to convert mains alternating-current (AC) power to low-voltage regulated direct-current (DC) power suitable for use by the IHS 100. In operation, the PSU 118 is coupled to an AC power source 120. In some examples, the AC power source 120 includes mains AC power (e.g., as supplied by an electric utility). In an embodiment, a chassis 116 houses some or all of the components of IHS 100. It should be understood that other buses and intermediate circuits can be deployed between the components described above and processor 102 to facilitate interconnection between the components and the processor 102. Similarly, it should be understood that other buses and intermediate circuits can be deployed between the components/processor 102 and the PSU 118 to facilitate power distribution to each of the components and the processor 102.

Figure 2:
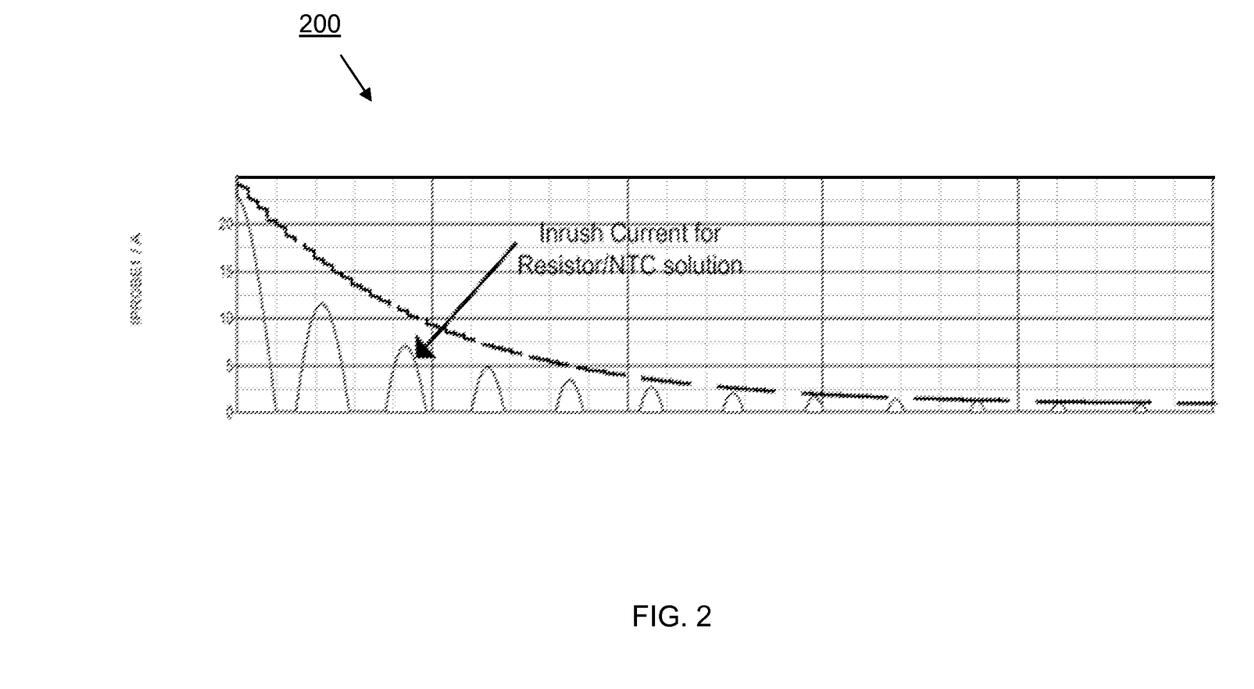
FIG. 2 is an illustration of an inrush current profile versus time for inrush current limiting circuits based on power resistors or NTC resistors.

Referring now to FIG. 2, an inrush current profile 200 versus time for inrush current limiting circuits based on power resistors or NTC resistors is illustrated. The inrush current profile 200 is typical of a conventional PSU which limits inrush current to an electrolytic capacitor at turn-on (e.g., when an AC power source is connected to the PSU) by way of a power resistor or a negative temperature coefficient (NTC) resistor in series with the line input or in series with the electrolytic capacitor. As described above, the power resistor or NTC resistor used to limit inrush current is short-circuited, in steady state, by a relay or a metal-oxide-semiconductor field-effect transistor (MOSFET) connected in parallel to the power resistor or NTC resistor. While somewhat effective, power resistors and NTC resistors are very bulky, a necessity to satisfy pulse power requirements. In addition, conventional inrush current limiting circuits (e.g., based on power resistors or NTC resistors) may still result in current transients that are non-constant, and which have a much higher peak-to-average ratio, as illustrated by the inrush current profile 200. Such inrush current behavior, as exhibited by conventional inrush current limiters, while providing some limits on the inrush current may nevertheless degrade a circuit and/or component lifetime (e.g., of a capacitor, a rectifier, a fuse, a breakers, etc.). Additionally, the bulky power resistors, NTC resistors, and AC relays used in conventional inrush current limiting circuits occupy valuable real estate (e.g., within the IHS 100) as they have to be sized to handle peak inrush current, and are more costly than embodiments of the present disclosure.

In particular, embodiments described herein provide for replacement of bulky circuit components (e.g., NTC resistor, AC relay) with much smaller surface-mounted devices (SMDs) or surface-mount technology (SMT) transistors, which take up considerably less space, and cost less than their bulky counterparts. Additionally, by not using an AC relay, there is no coil drive power loss for light loads, thus improving light load efficiency during a sleep or standby mode of operation (e.g., of a computer system). Moreover, as shown and described with reference to FIG. 6, embodiments of the present disclosure provide for a constant, controllable inrush current that will improve component lifetime (e.g., lifetime of capacitors, rectifiers, fuses, breakers, etc.). Since the loss/heat generated by the inrush current is only dependent on the bulk capacitor used in the circuit, a constant level inrush current as provided by the embodiments described herein provides for the use of a dissipating device (e.g., power MOSFET) with a much lower power level rating, for example, as compared to conventional solutions. Various embodiments may also include the use of a printed circuit board (PCB) as a heatsink, providing of efficient heat management.

Figure 3:
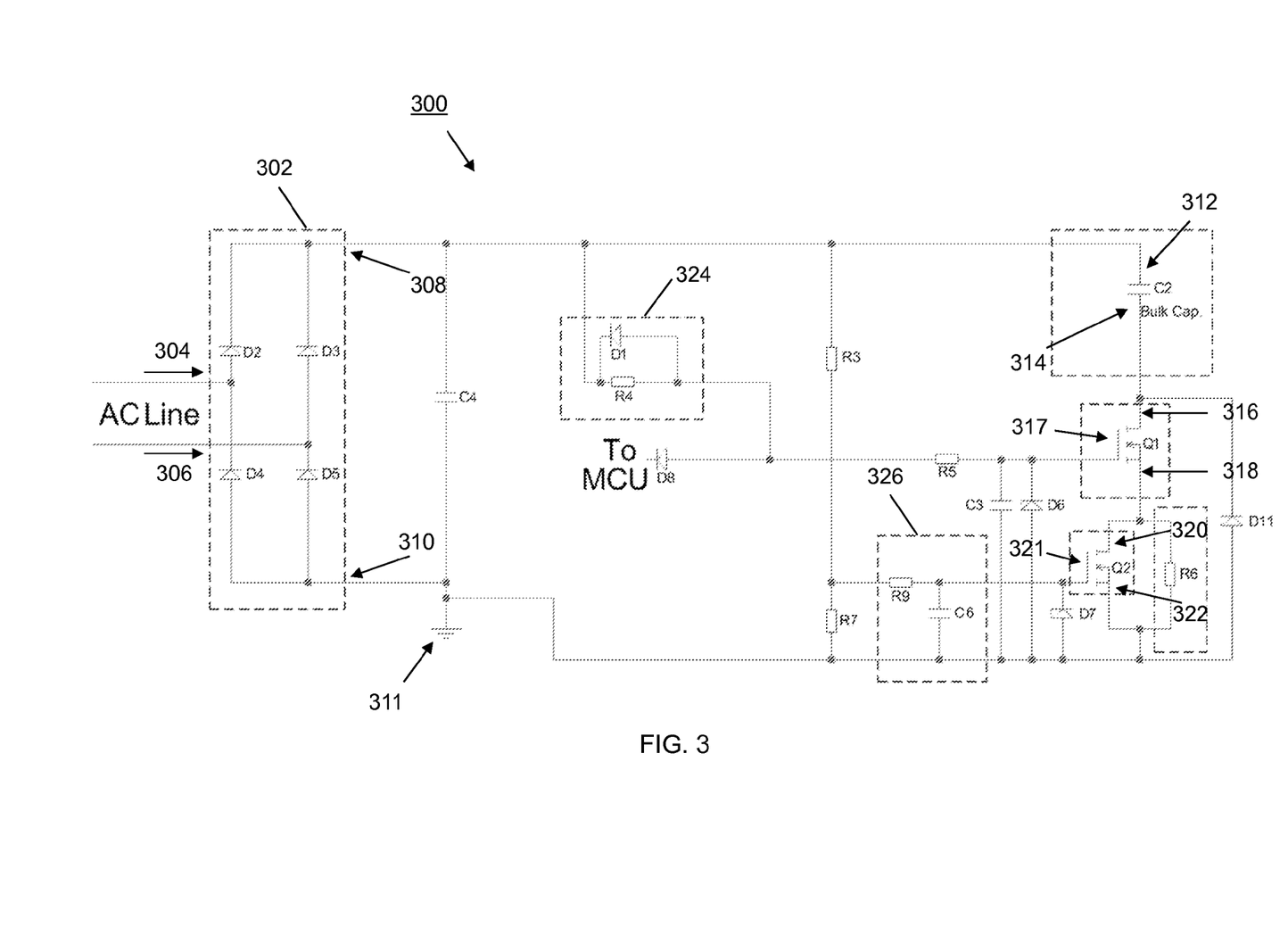
FIG. 3 is a schematic view of an inrush current limiting circuit, according to some embodiments.

Referring now to FIG. 3, a schematic view of an inrush current limiting circuit 300 is illustrated. The inrush current limiting circuit 300 includes a rectifier module 302 configured to rectify an input voltage, such as from the AC power source 120 (FIG. 1). In some examples, the AC power source 120 may couple to the rectifier module 302 by way of first and second input terminals 304, 306. As shown, the rectifier module 302 includes a diode D2, a diode D3, a diode D4, and a diode D5. In various examples, the diodes D2-D5 form a diode rectifier bridge that is configured to receive an AC signal (e.g., from the AC power source 120) and provide a rectified signal by way of first and second output terminals 308, 310. As illustrated, the second output terminal 310 may be coupled to a ground terminal 311. In some embodiments, the diodes D2-D5 may include power diodes suitable for switching power supplies, such as a power diode selected from one or more of an MUR105 diode, an MUR110 diode, an MUR115 diode, an MUR120 diode, an MUR130 diode, an MUR140 diode, an MUR160 diode, and an MUR180 diode. While a few examples of models of power diodes that may be used to implement the rectifier module 302, these examples are not meant to be limiting in any way, and those skilled in the art will understand that other models of power diodes may equally be used without departing from the scope of the present disclosure.

The inrush current limiting circuit 300 further includes a capacitor C2. By way of example, the capacitor C2 may include a bulk output capacitor having a rating of around 450 µF/450V. Capacitor C2 may include an electrolytic capacitor, a ceramic capacitor, a film capacitor, or other type of capacitor as known in the art. As shown, the capacitor C2 includes a first terminal 312 coupled to the first output terminal 308 of the rectifier module 302. In some embodiments, a capacitor C4 may be connected, at a first terminal, to the first output terminal 308 of the rectifier module 302, and at a second terminal to the second output terminal 310 of the rectifier module 302 (which is coupled to the ground terminal 311). By way of example, capacitor C4 may include a high-frequency (HF) capacitor which acts as a HF filter. In some examples, the capacitor C4 may include a ceramic capacitor, a film capacitor, or other type of capacitor as known in the art. In some examples, the capacitor C4 may have a value of about 100 nF.

Continuing with the example of FIG. 3, the inrush current limiting circuit 300 further includes a transistor Q1 including first and second current electrodes 316, 318, as well as a gate electrode 317. In the example of FIG. 3, transistor Q1 includes an N-channel MOSFET, where the first current electrode 316 is a drain electrode and the second current electrode 318 is a source electrode. In some embodiments, transistor Q1 includes a 500V-600V N-channel power MOSFET. However, other suitable power MOSFETs (or other types of transistors, such as an IGBT, etc.) having other ratings may also be used for the transistor Q1. By way of example, transistor Q1 may include a power transistor packaged in one of a variety of discrete SMT packages such as DPAK, D2PAK, or D3PAK, among others. The first current electrode 316 of the transistor Q1 is coupled to a second terminal 314 of the capacitor C2. The inrush current limiting circuit 300 also includes a transistor Q2 including first and second current electrodes 320, 322, as well as a gate electrode 321. In the example of FIG. 3, transistor Q2 includes an N-channel MOSFET, where the first current electrode 320 is a drain electrode and the second current electrode 322 is a source electrode. In some embodiments, transistor Q2 includes a 30V N-channel power MOSFET. However, other suitable power MOSFETs having other ratings may also be used for the transistor Q2. By way of example, transistor Q2 may include a power transistor packaged in one of a variety of discrete SMT packages (smaller than the package used for transistor Q1) such as SOT-23, SC-70, SOT-66, SOT-89, SOT-143, SOT-223 and TSOT-23, among others. While a few examples of packages have been given, these examples are not meant to be limiting in any way, and those skilled in the art will understand that other packages and package types may equally be used without departing from the scope of the present disclosure. The first current electrode 320 of the transistor Q2 is coupled to a second current electrode 318 of the transistor Q1. The second current electrode 322 of the transistor Q2 is coupled to the second output terminal 310 of the rectifier module 302 (which is coupled to the ground terminal 311). In various embodiments, a resistor R6 is connected in parallel with the transistor Q2. In some embodiments, resistor R6 may include a resistor packaged in a two-terminal SMT package such as one of 01005, 0201, 0402, 0603, 0805, 1008, 1206, 1210, 1806, 1812, 2010, 2512, and 2920. While a few examples of resistor packages having a particular footprint have been given, these examples are not meant to be limiting in any way, and those skilled in the art will understand that other resistor packages having a variety of footprints may equally be used without departing from the scope of the present disclosure. In the embodiments, described herein, the resistor R6 is configured to set an inrush current value. That is, a value of the resistor R6 is selected so as to achieve a desired inrush current value. In various embodiments, the value of the resistor R6, together with the transistor Q1 (e.g., current-voltage characteristics of transistor Q1), determine the inrush current value. In some embodiments, a value of the resistor R6 is about 5 Ohms. However, any of a variety of resistor values may be chosen to tune the inrush current value in accordance with a particular technology capability and/or application need. In various embodiments, a fast recovery diode D11, having a rating of about 500V-600V, is also connected anti-parallel to transistors Q1 and Q2, for example to reduce the voltage spike caused by diode recovery.

As shown in FIG. 3, the inrush current limiting circuit 300 also includes a charging module 324 including a resistor R4 and a diode D1. In some examples, resistor R4 may include a resistor packaged in a two-terminal SMT package such as one of 01005, 0201, 0402, 0603, 0805, 1008, 1206, 1210, 1806, 1812, 2010, 2512, and 2920. These resistor packages are merely exemplary, and the present embodiments are not meant to be limited in any way, beyond what is written in the claims that follow. In some embodiments, a value of the resistor R4 is about 600 kOhms. However, any of a variety of resistor values may be chosen to for the resistor R4 in accordance with a particular technology capability and/or application need. In some embodiments, diode D1 may include a power diode, such as a power diode selected from one or more of an MUR105 diode, an MUR110 diode, an MUR115 diode, an MUR120 diode, an MUR130 diode, an MUR140 diode, an MUR160 diode, an MUR180 diode, or other diode as known in the art. These power diodes are merely exemplary, and the present embodiments are not meant to be limited in any way, beyond what is written in the claims that follow. In various examples, after coupling the inrush current limiting circuit 300 to a power source (e.g., the AC power source 120), the charging module 324 is configured to charge the gate electrode 317 of transistor Q1 and thus turn-on transistor Q1. In addition, a diode D6 coupled between the gate electrode 317 of transistor Q1 and the second output terminal 310 of the rectifier module 302 (i.e., the ground terminal 311) serves to set a gate-to-ground voltage for transistor Q1. In some embodiments, the diode D6 includes a Zener diode. In some cases, diode D6 includes a 12V Zener diode; however, other diode values may be chosen to set the gate-to-ground voltage for transistor Q1 for example based on characteristics of transistor Q1, based on a particular technology capability, and/or based on an application need. By way of example, when the inrush current limiting circuit 300 is coupled to a power source, the charging module 324 charges the gate electrode 317 of transistor Q1 up to a value determined by the diode D6. Thus, in an example, if diode D6 is a 12V Zener diode, the gate electrode 317 of transistor Q1 may be charged up until the gate-to-ground voltage for transistor Q1 is equal to about 12V. To be sure, a value of a gate-to-source voltage for transistor Q1 will be equal to the gate-to-ground voltage of transistor Q1 minus a voltage drop of resistor R6. However, in various embodiments, the gate-to-source voltage of transistor Q1 is just large enough to maintain a steady-state, constant inrush current. The inrush current, in embodiments described herein, serves to charge the capacitor C2. In some embodiments, a capacitor C3 is connected in parallel to diode D6, for example, to provide noise filtering. In some cases, a value of the capacitor C3 is about 100 nF. In some examples, capacitor C3 may include an electrolytic capacitor, a ceramic capacitor, a film capacitor, or other type of capacitor as known in the art. In some embodiments, a diode D7 may also be coupled between the gate electrode 321 of transistor Q2 and the second output terminal 310 of the rectifier module 302 (i.e., the ground terminal 311) to set a gate-to-ground voltage for transistor Q2. In some embodiments, the diode D7 includes a Zener diode (e.g., a 12V Zener diode). As with the case of diode D6, any of a variety of diode values may be chosen for diode D7 in order to set the gate-to-ground voltage for transistor Q2, for example based on characteristics of transistor Q2, based on a particular technology capability, and/or based on an application need. In various examples, a value of a gate-to-source voltage for transistor Q2 will be equal to the gate-to-ground voltage of transistor Q2.

In various embodiments, the inrush current limiting circuit 300 further includes a delay circuit 326 coupled to the gate electrode 321 of the transistor Q2. In some examples, the delay circuit 326 includes a resistor R9 and a capacitor C6. In various embodiments, after coupling the inrush current limiting circuit 300 to a power source (e.g., the AC power source 120), charging of the gate electrode 321 of transistor Q2, and thus turn-on of transistor Q2, is delayed in accordance with an RC delay time associated with resistor R9 and capacitor C6. By way of example, values of resistor R9 and capacitor C6 are chosen such that transistor Q2 turns-on after capacitor C2 is fully charged (e.g., by the inrush current flowing through capacitor C2, transistor Q1, and resistor R6). In some examples, values of resistor R9 and capacitor C6 are chosen such that transistor Q2 turns-on in about 200-400 ms. In some embodiments, a value of the resistor R9 is about 100 kOhms, and the value of capacitor C6 is about 10 µF. In some embodiments, resistor R9 may include a resistor packaged in a two-terminal SMT package such as one of 01005, 0201, 0402, 0603, 0805, 1008, 1206, 1210, 1806, 1812, 2010, 2512, and 2920. These resistor packages are merely exemplary, and the present embodiments are not meant to be limited in any way, beyond what is written in the claims that follow. In some examples, capacitor C6 may include an electrolytic capacitor, a ceramic capacitor, a film capacitor, or other type of capacitor as known in the art. After transistor Q2 is turned-on, the inrush current limiting circuit 300 is configured to short-circuit resistor R6 such that the current flowing through the capacitor C2 at steady-state is at low impedance. In various examples, turning-on transistor Q2 will ensure a low impedance path in series with capacitor C2 during steady-state. Thus, the inrush current limiting circuit 300 provides a constant charge/inrush current (e.g., to capacitor C2), thereby improving lifetime of various circuit components (e.g., including capacitors, rectifiers, fuses, breakers, etc.). Moreover, embodiments described herein, which utilize small form-factor power MOSFETS, allow for the removal of bulky components (e.g., power resistors, NTC resistors, relays) used in conventional inrush current limiting circuits. Moreover, by using SMT MOSFETs for transistors Q1 and Q2 (e.g., instead of power resistors, NTC resistors, relays) and by using the PCB as a heatsink, the heat/loss of the inrush current limiting circuit 300 is well-managed.

In some embodiments, the inrush current limiting circuit 300 may include other resistors, capacitors, diodes, inductors, relays, transistors, and/or other active or passive components as known in the art, without departing from the scope of the present disclosure. For example, in some embodiments, a resistor R3 may be coupled between the first electrode 312 of the capacitor C2 and resistor R9 of the delay circuit 326. In some examples, a resistor R7 may be coupled between the resistor R3 and the ground electrode 311. In some embodiments, a resistor R5 may be coupled between the gate electrode 317 of transistor Q1 and the charging module 324. In various embodiments, each of the resistors R3, R5, and R7 may include a resistor packaged in a two-terminal SMT package such as one of 01005, 0201, 0402, 0603, 0805, 1008, 1206, 1210, 1806, 1812, 2010, 2512, and 2920. These resistor packages are merely exemplary, and the present embodiments are not meant to be limited in any way, beyond what is written in the claims that follow. In at least one example, a value of resistor R3 may be around 200 kOhms, a value of resistor R5 may be around 10 Ohms, and a value of resistor R7 may be around 10 kOhms. It will be understood, however, that any of a variety of resistor values for resistors R3, R5, and R7 may be chosen in accordance with a particular technology capability and/or application need. In some embodiments, the inrush current limiting circuit 300 also includes a diode D8 that is coupled between resistor R5 and a microcontroller/microprocessor (MCU), such as the processor 102 illustrated in FIG. 1. In some embodiments, diode D8 may include a power diode, such as a power diode selected from one or more of an MUR105 diode, an MUR110 diode, an MUR115 diode, an MUR120 diode, an MUR130 diode, an MUR140 diode, an MUR160 diode, an MUR180 diode, or other diode as known in the art. These power diodes are merely exemplary, and the present embodiments are not meant to be limited in any way, beyond what is written in the claims that follow. Additionally, in some embodiments, the inrush current limiting circuit 300 may further include a DC-DC converter downstream to generate the voltage (e.g., 12V) for downstream computing devices.

Figure 4:
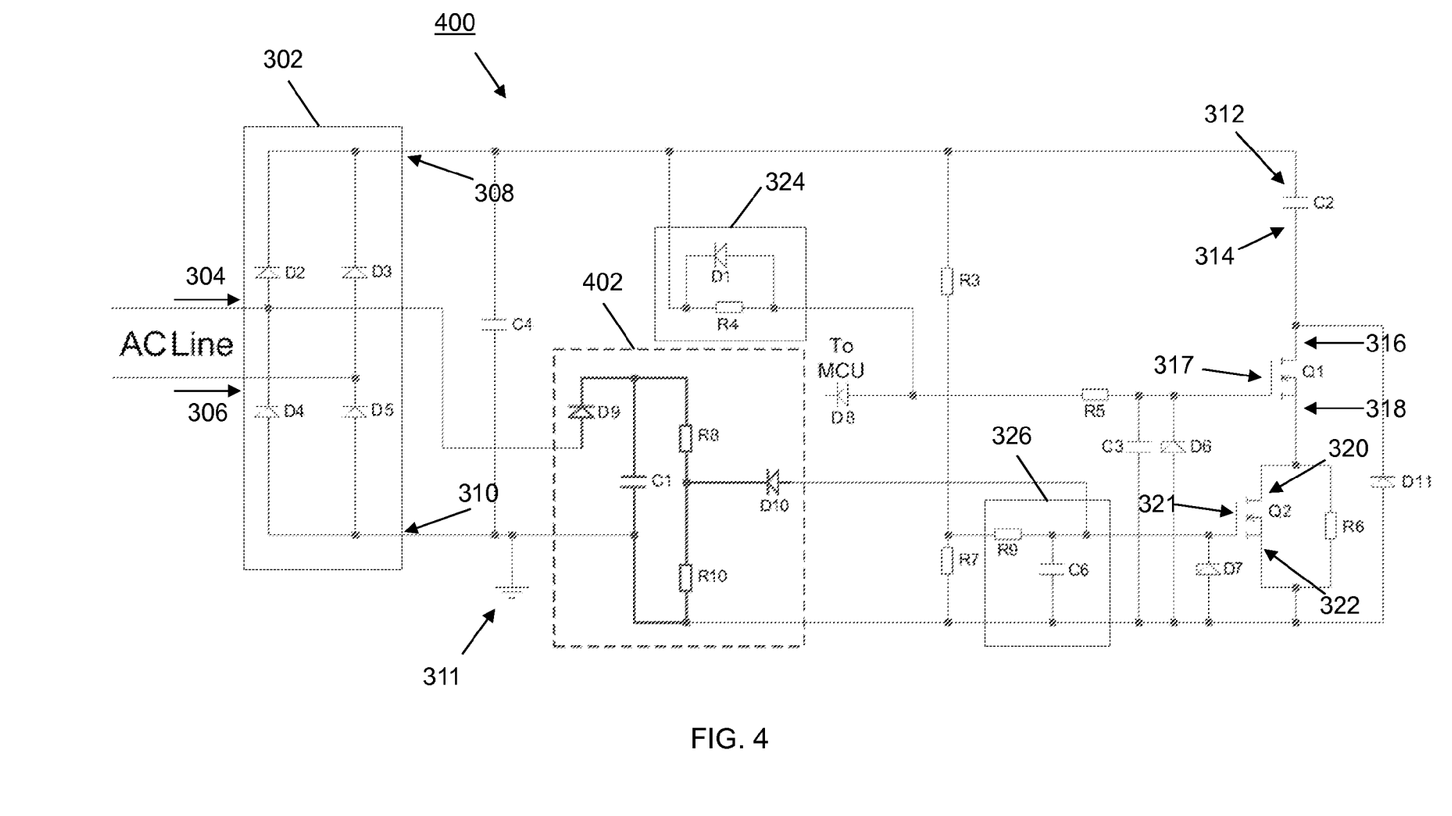
FIG. 4 is a schematic view of an inrush current limiting circuit, including a discharging circuit, according to some embodiments.

Referring now to FIG. 4, a schematic view of an inrush current limiting circuit 400 is illustrated. In large part, the inrush current limiting circuit 400 has similar components as, and operates similar to, the inrush current limiting circuit 300. However, the inrush current limiting circuit 400 also includes a discharging module 402. The discharging module includes diodes D9, D10, resistors R8, R10, and capacitor C1. In various embodiments, when the inrush current limiting circuit 300 is disconnected from the power source (e.g., the AC power source 120), the discharging module 402 is configured to quickly discharge the gate electrode 321 of transistor Q2, ensuring that transistor Q2 is quickly turned-off upon power disconnection. This may be particularly important, for example, during a "contact bouncing" condition (i.e., where the AC power source 120 is quickly connected/disconnected from the inrush current limiting circuit 400. In some embodiments, a value of the resistor R8 is about 100 kOhms, the value of resistor R10 is about 5 kOhms, and the value of capacitor C1 is about 560 nF. In some embodiments, resistors R8, R10 may include a resistor packaged in a two-terminal SMT package such as one of 01005, 0201, 0402, 0603, 0805, 1008, 1206, 1210, 1806, 1812, 2010, 2512, and 2920. These resistor packages are merely exemplary, and the present embodiments are not meant to be limited in any way, beyond what is written in the claims that follow. In some examples, capacitor C1 may include an electrolytic capacitor, a ceramic capacitor, a film capacitor, or other type of capacitor as known in the art. In some embodiments, diodes D9, D10 may include a power diode, such as a power diode selected from one or more of an MUR105 diode, an MUR110 diode, an MUR115 diode, an MUR120 diode, an MUR130 diode, an MUR140 diode, an MUR160 diode, an MUR180 diode, or other diode as known in the art. These power diodes are merely exemplary, and the present embodiments are not meant to be limited in any way, beyond what is written in the claims that follow. Additionally, in some embodiments, the inrush current limiting circuit 400 may further include a DC-DC converter downstream to generate the voltage (e.g., 12V) for downstream computing devices.

Figure 5:
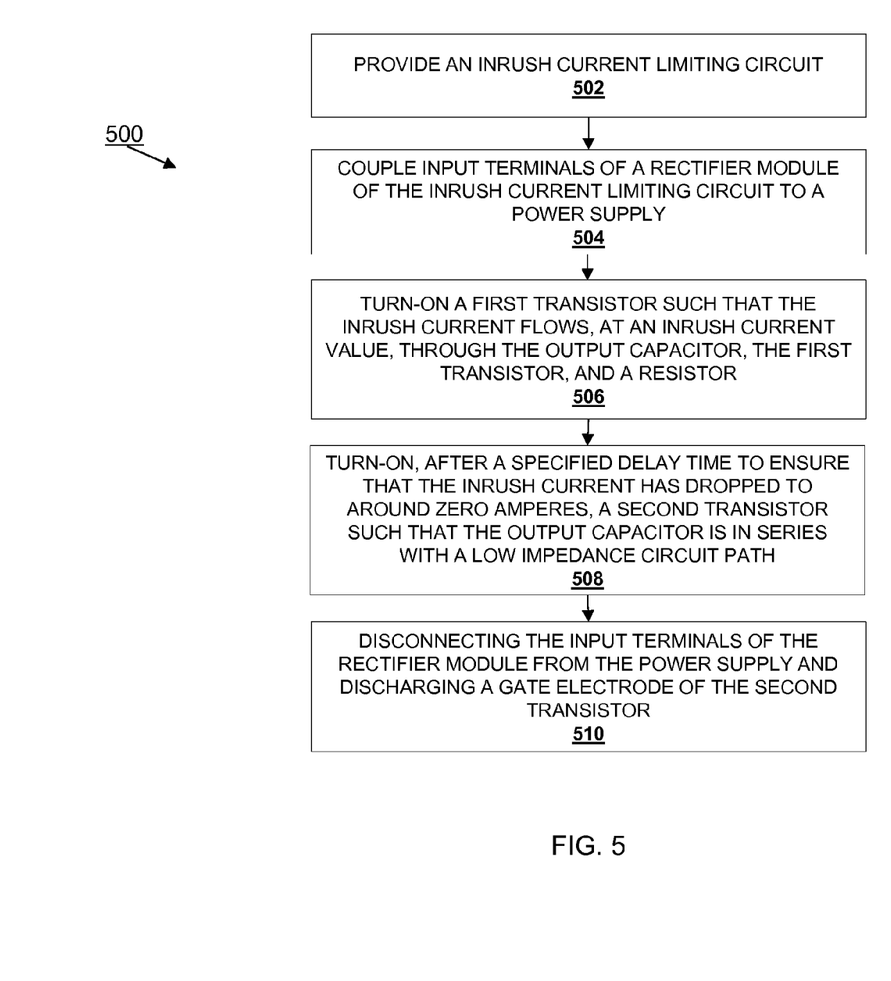
FIG. 5 is a flow chart illustrating an embodiment of a method for limiting an inrush current.

Referring now to FIG. 5, an embodiment of a method 500 for limiting an inrush current is illustrated. The method 500 begins at block 502 where an inrush current limiting circuit is provided. In an embodiment, the inrush current limiting circuit 300 discussed above with reference to FIG. 3, is provided. In another embodiment, the inrush current limiting circuit 400 discussed above with reference to FIG. 4, is provided. With reference to the embodiments illustrated in FIGS. 5-8 and discussed below, the inrush current limiting circuit 300 (or the inrush current limiting circuit 400) is provided as part of IHS 100 (FIG. 1).

The method 500 then proceeds to block 504 where the input terminals of a rectifier module of the inrush current limiting circuit are coupled to a power supply. Referring to FIGS. 1, 3, and 4, in an embodiment of block 504, the AC power source 120 (FIG. 1) is coupled to the rectifier module 302 (FIGS. 3, 4) by way of first and second input terminals 304, 306 (FIGS. 3, 4). In various embodiments, prior to coupling the inrush current limiting circuit 300/400 to a power source (e.g., the AC power source 120), transistors Q1 and Q2 are both in an OFF-state and capacitor C2 has substantially no stored charge. Initially, after coupling of the AC power source 120 to the rectifier module 302, a majority of the voltage drop at the output is applied between the drain and source (Vds) of transistor Q1 (i.e., between electrodes 316, 318) because transistor Q2 is shorted by the resistor R6.

Figure 6:
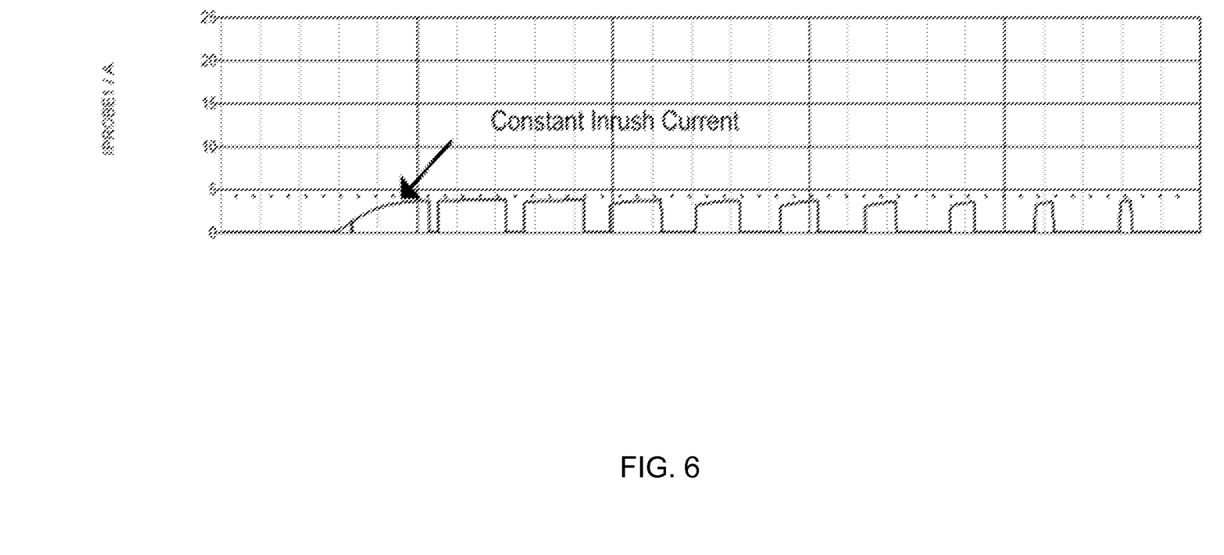
FIG. 6 is an illustration of an inrush current profile versus time for inrush current limiting circuits implemented according to some embodiments.

The method 500 then proceeds to block 506 where a first transistor is turned-on and an inrush current flows, at a substantially constant inrush current value, through an output capacitor, the first transistor, and a resistor. Referring to FIGS. 1, 3, and 4, in an embodiment of block 506, the applied AC input voltage (e.g., from the AC power source 120), rectified by the rectifier module 302, begins to charge the gate electrode 317 of transistor Q1 by way of the charging module 324. In some embodiments, the charging module 324 charges the gate electrode 317 of transistor Q1 until a gate-to-ground voltage of transistor Q1 is equal to a voltage set by Zener diode D6. In at least one example, the charging module 324 charges the gate electrode 317 of transistor Q1 until a gate-to-ground voltage of transistor Q1 is equal to about 12V. To be sure, in some embodiments, a threshold voltage (Vt) of transistor Q1 may have a value of about 3-4V. Thus, transistor Q1 turns-on, and current starts to flow, after the gate-to-source voltage (Vgs) of transistor Q1 is greater than the threshold value, where Vgs is equal to the transistor Q1 gate-to-ground voltage minus a voltage drop on resistor R6. In some embodiments, after transistor Q1 turns-on, and while transistor Q2 is still turned-off, inrush current through the capacitor C2, transistor Q1, and resistor R6 begins to rise. In particular, the inrush current will increase up to a pre-determined value, as determined by resistor R6 and the current-voltage characteristics of transistor Q1. Moreover, the inrush current will reach an equilibrium value and remain constant at that equilibrium value. The gate-to-source voltage (Vgs) of transistor Q1 (transistor Q1 gate-to-ground voltage minus R6 voltage drop) is just large enough to keep the inrush current at the set, constant value (e.g., about 1.3 A when resistor R6 is about 5 Ohms). FIG. 6 illustrates the rise to, and maintenance of, a constant inrush current value versus time, in accordance with embodiments of the present disclosure. Additionally, in various embodiments, transistor Q1 will operate in a linear region of operation and the impedance of transistor Q1 is variable based on the instantaneous voltage appearing at the output terminals 308, 310 of the rectifier module 302. However, the inrush current flowing through the capacitor C2, transistor Q1, and resistor R6 remains constant. In particular, and in various examples, the inrush current flowing through the capacitor C2, transistor Q1, and resistor R6 serves to charge the capacitor C2.

The method 500 then proceeds to block 508 where, after waiting a specified delay time to ensure that the inrush current has dropped to a value of about zero amperes, a second transistor is turned-on. Referring to FIGS. 3 and 4, in an embodiment of block 508, charging of the gate electrode 321 of the transistor Q2 is delayed in accordance with an RC delay time associated with resistor R9 and capacitor C6. In particular, values of resistor R9 and capacitor C6 are chosen such that transistor Q2 turns-on after capacitor C2 is fully charged (e.g., by the inrush current flowing through capacitor C2, transistor Q1, and resistor R6). Thus, after capacitor C2 is fully charged, transistor Q2 turns-on and short-circuits resistor R6. Transistor Q2 provides a low impedance path in series with capacitor C2 during steady-state. As used herein, "steady-state" means that inrush current drops to zero, while there remains an AC ripple current flowing through the current path. The constant charge/inrush current (e.g., to capacitor C2) provided by the inrush current limiting circuit 300/400 improves lifetime of various circuit components (e.g., including capacitors, rectifiers, fuses, breakers, etc.).

The method 500 then proceeds to block 510 where the input terminals of the rectifier module are disconnected from the power supply and a gate electrode of the second transistor is discharged. Referring to FIG. 4, in an embodiment of block 510, the input terminals 304, 306 of the rectifier module 302 of the inrush current limiting circuit 400 are disconnected from the power source (e.g., the AC power source 120). In response, the discharging module 402 quickly discharges the gate electrode 321 of transistor Q2 and ensures that transistor Q2 is quickly turned-off upon power disconnection. Operation of the discharging module 402 may be particularly important, for example, during a contact bouncing condition, where the AC power source 120 is quickly connected/disconnected from the inrush current limiting circuit 400.

Figure 7A:
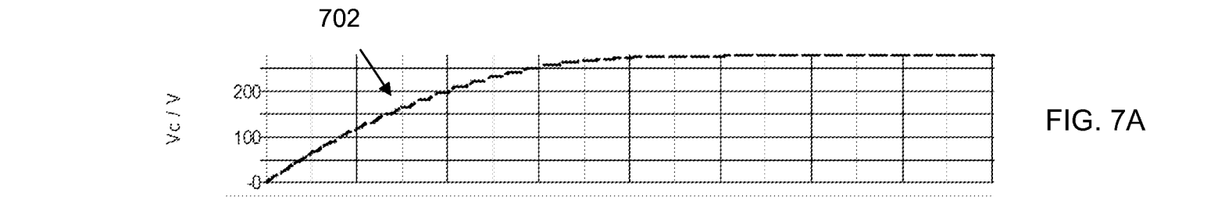
FIGS. 7A, 7B, and 7C illustrate a capacitor voltage profile, a capacitor current profile, and a first transistor gate-to-source voltage profile versus time for inrush current limiting circuits implemented according to some embodiments.
Figure 7B:
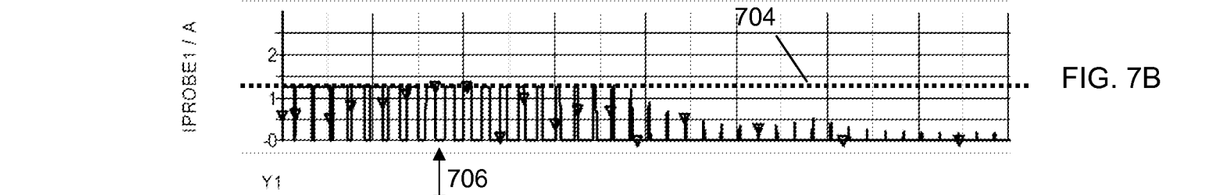
Figure 7C:
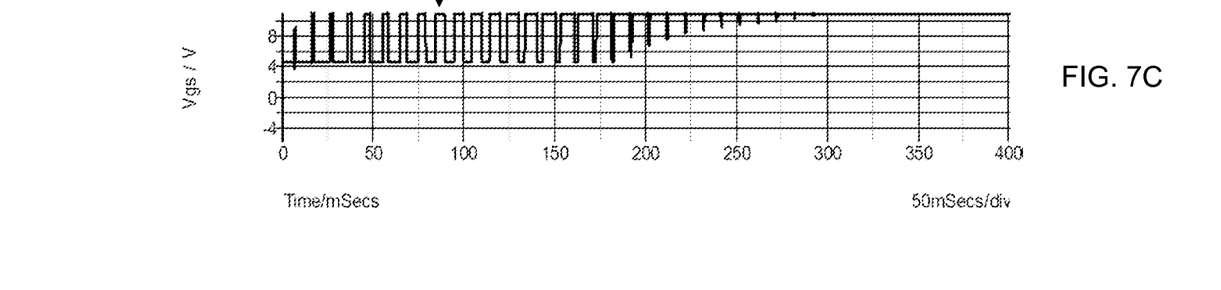

For a more detailed explanation of operation of the inrush current limiting circuit 300/400, reference is made to FIGS. 7A, 7B, and 7C, where waveforms of capacitor C2 voltage (Vc), charging current (IPROBE1), and transistor Q1 gate-to-source voltage (Vgs), respectively, are shown therein and as a function of time. In an embodiment, after coupling the AC power source 120 (FIG. 1) to the rectifier module 302 (FIGS. 3, 4), the gate electrode 317 voltage of transistor Q1 begins to increase and inrush current starts to flow (and thus the voltage of capacitor C2 begins to increase as indicated by arrow 702). The flow of the inrush current creates a voltage drop across resistor R6, where the actual gate-to-source voltage (Vgs) across transistor Q1 (gate-to-ground voltage of transistor Q1 minus voltage drop across resistor R6) brings transistor Q1 into a linear region of operation. In various examples, the inrush current will stay at a constant value (indicated by dashed line 704) regardless of how the line input voltage changes. When the rectified line voltage (e.g., at the output terminals 308, 310 of rectifier module 302) does drop below a voltage of capacitor C2, for example when the AC line input is around zero (e.g., at the input terminals 304, 306 of rectifier module 302), the gate-to-source voltage of transistor Q1 also will periodically increase to around the full value prescribed by the Zener diode D6 (e.g. around 12V), as indicated by arrow 706 and FIG. 7C. However, at such moments, the inrush current is around zero, as indicated by arrow 706 and FIG. 7B. The value of the inrush current flowing through both the capacitor C2 and transistor Q1, as discussed above, may readily be adjusted by changing the value of resistor R6. In some examples, by choosing a value of about 5 Ohms for resistor R6, the constant inrush current (and hence the capacitor C2 charging current) is limited to a constant value of about 1.3 A. From FIGS. 7A and 7B, it can also be seen that the voltage of capacitor C2 increases linearly, up to a fully charged value, and the charging current (i.e., inrush current) remains equal to or less than about 1.3 A.

Figure 8A:
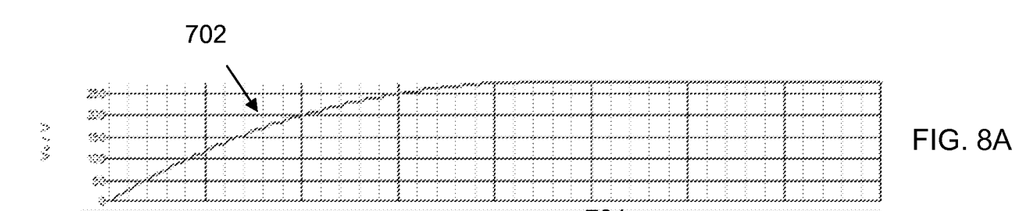
FIGS. 8A, 8B, and 8C illustrate a capacitor voltage profile, a capacitor current profile, and a first transistor drain-to-source voltage profile versus time for inrush current limiting circuits implemented according to some embodiments.
Figures 8B, 8C:
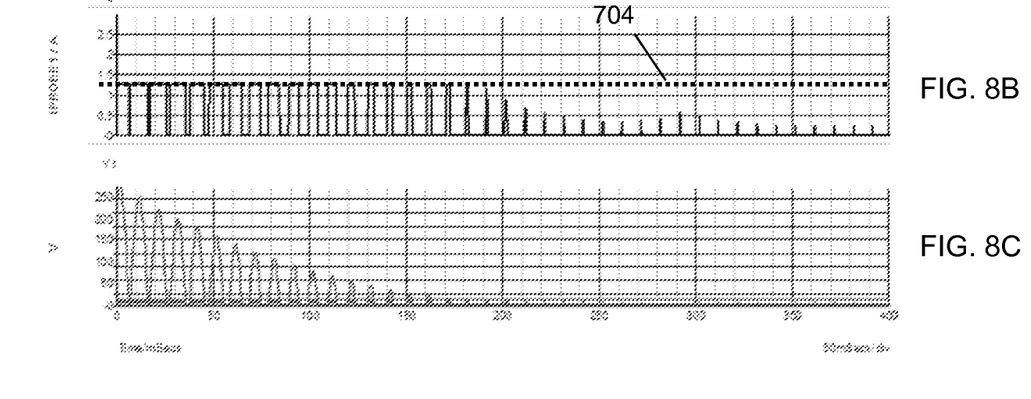
Figure 9A:
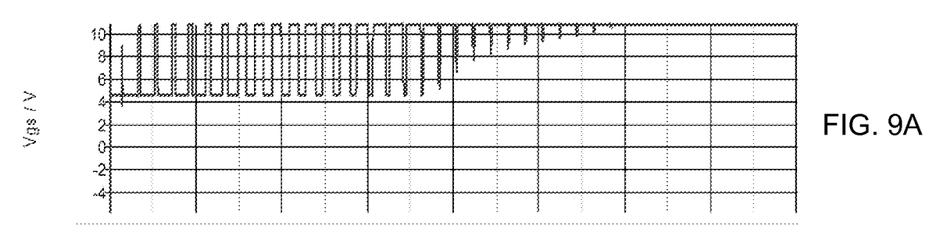
FIGS. 9A and 9B illustrate a first transistor gate-to-source voltage profile, and a second transistor gate-to-source voltage profile, versus time for inrush current limiting circuits implemented according to some embodiments.
Figure 9B:
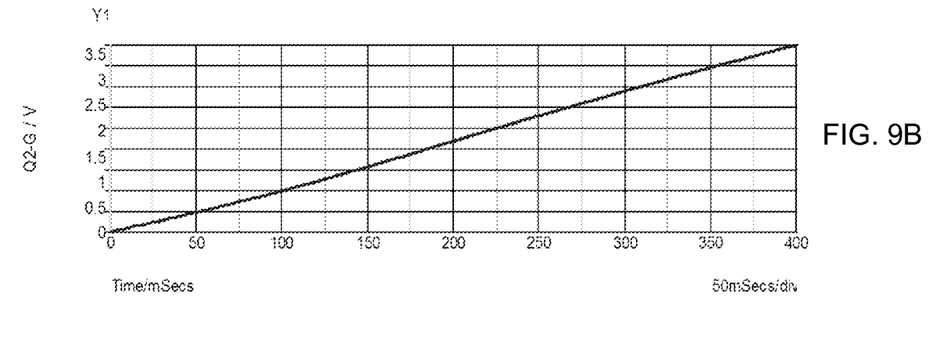

Continuing with the explanation of operation of the inrush current limiting circuit 300/400, FIGS. 8A, 8B, and 8C, illustrate waveforms of capacitor C2 voltage (Vc), charging current (IPROBE1), and transistor Q1 drain-to-source voltage (Vds), respectively and as a function of time. In some embodiments, FIGS. 8A and 8B are substantially the same as FIGS. 7A and 7B. Referring to FIG. 8C, it can be seen that the drain-to-source voltage (Vds) of transistor Q1 follows the rectified line voltage (i.e., the voltage at the output terminals 308, 310 of rectifier module 302). FIGS. 9A and 9B illustrate waveforms for a gate-to-source voltage (Vgs) of transistor Q1 and transistor Q2, respectively. From FIG. 9B, it is clear that the gate-to-source voltage of transistor Q2 slowly ramps up over time. This is due to the RC time constant of resistor R9 and capacitor C6 of delay circuit 326. As discussed above, the RC time constant of resistor R9 and capacitor C6 is larger than a charging time for capacitor C2. Thus, when the charging of capacitor C2 by the inrush current is complete (i.e., capacitor C2 has been charged to its full value), transistor Q2 will turn-on and short-circuit resistor R6.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power supply circuit, comprising:
   a power source coupling;
   a first power transistor that is coupled to the power source coupling and that is configured, in response to a power source being coupled to the power source coupling, to activate at a first time to allow an initial current from the power source to be provided to a chargeable element;
   a resistor that is coupled to the power source coupling and in series with the first power transistor, wherein the resistor is configured to limit the initial current that is provided to the chargeable element;
   a second power transistor that is coupled to the power source coupling and in parallel with the resistor; and
   a delay module that is coupled to the power source coupling and the second power transistor, wherein the delay module is configured, in response to the power source being coupled to the power source coupling, to activate the second power transistor at a second time that is subsequent to the first time and that occurs after the chargeable element has been completely charged.

2. The power supply circuit of claim 1, further comprising:
   a charging module that is coupled to the power source coupling and the first power transistor, wherein the charging module is configured, in response to the power source being coupled to the power source coupling, to cause the first power transistor to activate at the first time.

3. The power supply circuit of claim 1, further comprising:
   a rectifier module that is coupled between the power source coupling and each of the first power transistor, the second power transistor, and the resistor, wherein rectifier module is configured to rectify an alternating current received from the power source.

4. The power supply circuit of claim 1, further comprising:
   a discharging module that is coupled between the power source coupling and the second power transistor, wherein the discharging module is configured, in response to the power source being decoupled from the power source coupling, to cause the second power transistor to deactivate.

5. The power supply circuit of claim 1, wherein, in response to the power source being coupled to the power source coupling, the initial current from the power source that is provided to the chargeable element rises to a limit allowed by the resistor, remains constant at the limit allowed by the resistor to charge the chargeable element, and then drops below a predetermined value prior to the second time in response to the charging of the chargeable element.

6. The power supply circuit of claim 1, wherein the activation of the second power transistor at the second time short circuits the resistor and produces a current path that is in series with the first power transistor.

7. An information handling system (IHS), comprising:
   a processing system;
   a memory system that is coupled to the processing system; and
   a power supply subsystem that is coupled to processing system, wherein the power supply subsystem includes:
   a first power transistor that is configured, in response to a power source being coupled to the power supply subsystem, to activate at a first time to allow an initial current from the power source to be provided to a chargeable element;

a resistor that is coupled in series with the first power transistor, wherein the resistor is configured to limit the initial current that is provided to the chargeable element;

a second power transistor that is coupled in parallel with the resistor; and a delay module that is coupled to the power source and the second power transistor, wherein the delay module is configured, in response to the power source being coupled to the power supply subsystem, to activate the second power transistor at a second time that is subsequent to the first time and that occurs after the chargeable element has been completely charged.

8. The IHS of claim 7, wherein the power supply subsystem includes:

a charging module that is coupled to the first power transistor, wherein the charging module is configured, in response to the power source being coupled to the power supply subsystem, to cause the first power transistor to activate at the first time.

9. The IHS of claim 7, wherein the power supply subsystem includes:

a rectifier module that couples each of the first power transistor, the second power transistor, and the resistor to the power source when the power source is coupled to the power supply subsystem, wherein rectifier module is configured to rectify an alternating current received from the power source.

10. The IHS of claim 7, wherein the power supply subsystem includes:

a discharging module that is coupled to the second power transistor, wherein the discharging module is configured, in response to the power source being decoupled from the power supply subsystem, to cause the second power transistor to deactivate.

11. The IHS of claim 7, wherein, in response to the power source being coupled to the power supply subsystem, the initial current from the power source that is provided to the chargeable element rises to a limit allowed by the resistor, remains constant at the limit allowed by the resistor to charge the chargeable element, and then drops below a predetermined value prior to the second time in response to the charging of the chargeable element.

12. A method for supplying power, comprising:

activating, in response to a coupling to a power source, a first power transistor at a first time to allow an initial current from the power source to be provided to a chargeable element;

limiting the initial current that is provided to the chargeable element by a resistor that is coupled in series with the first power transistor; and activating, by a delay module and in response to coupling to the power source coupling, a second power transistor that is coupled in parallel with the resistor at a second time that is subsequent to the first time and that occurs after the chargeable element has completely charged.

13. The method of claim 12, further comprising:

rectifying an alternating current received from the power source and provided to the first power transistor and the resistor as the initial current.

14. The method of claim 12, further comprising:

deactivating, in response to decoupling from the power source, the second power transistor.

15. The method of claim 12, wherein, in response to the coupling to the power source, the initial current from the power source that is provided to the chargeable element rises to a limit allowed by the resistor, remains constant at the limit allowed by the resistor to charge the chargeable element, and then drops below a predetermined value prior to the second time in response to the charging of the chargeable element.

* * * * *